United States Patent Office 3,338,130
Patented Aug. 29, 1967

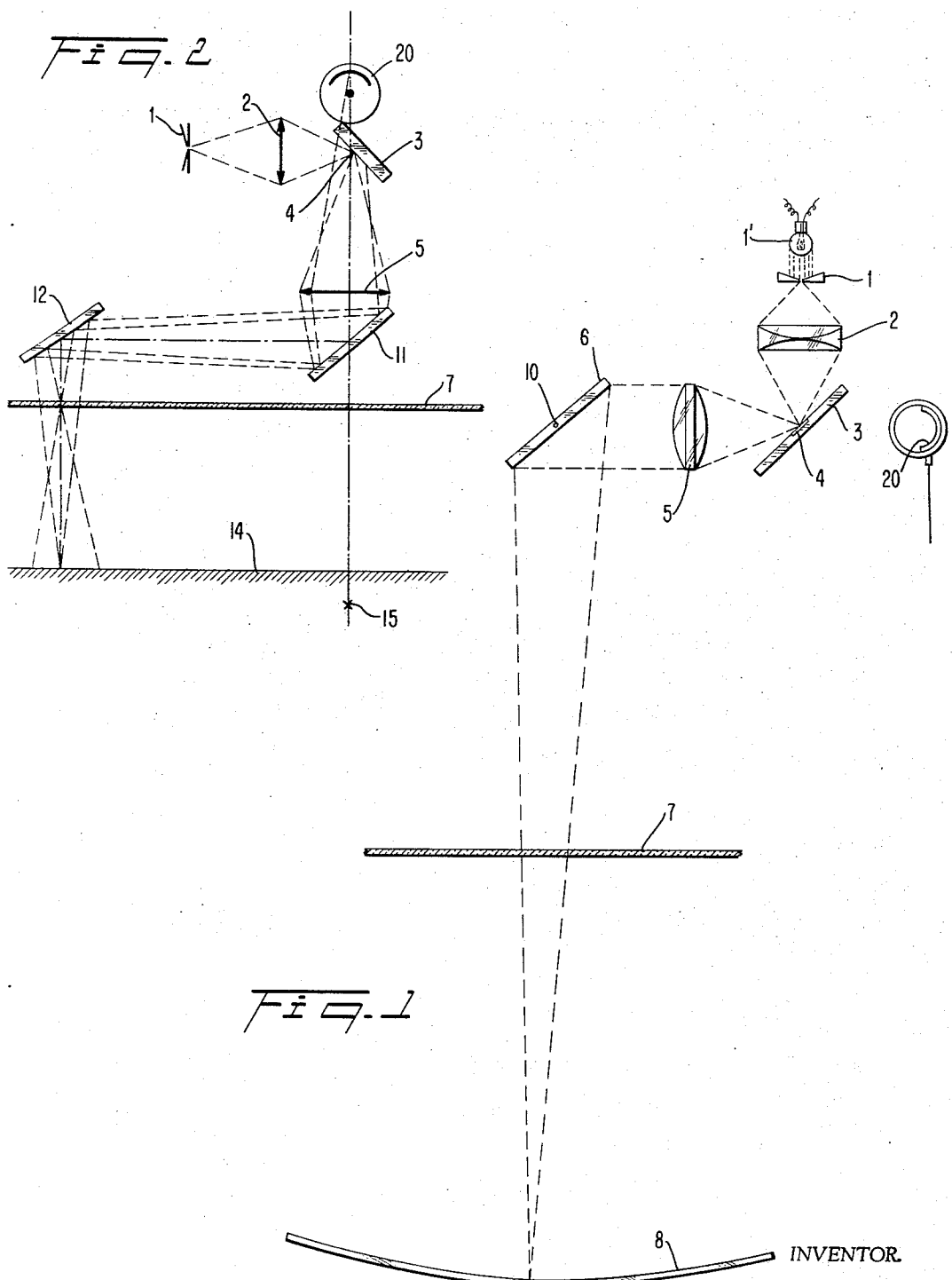

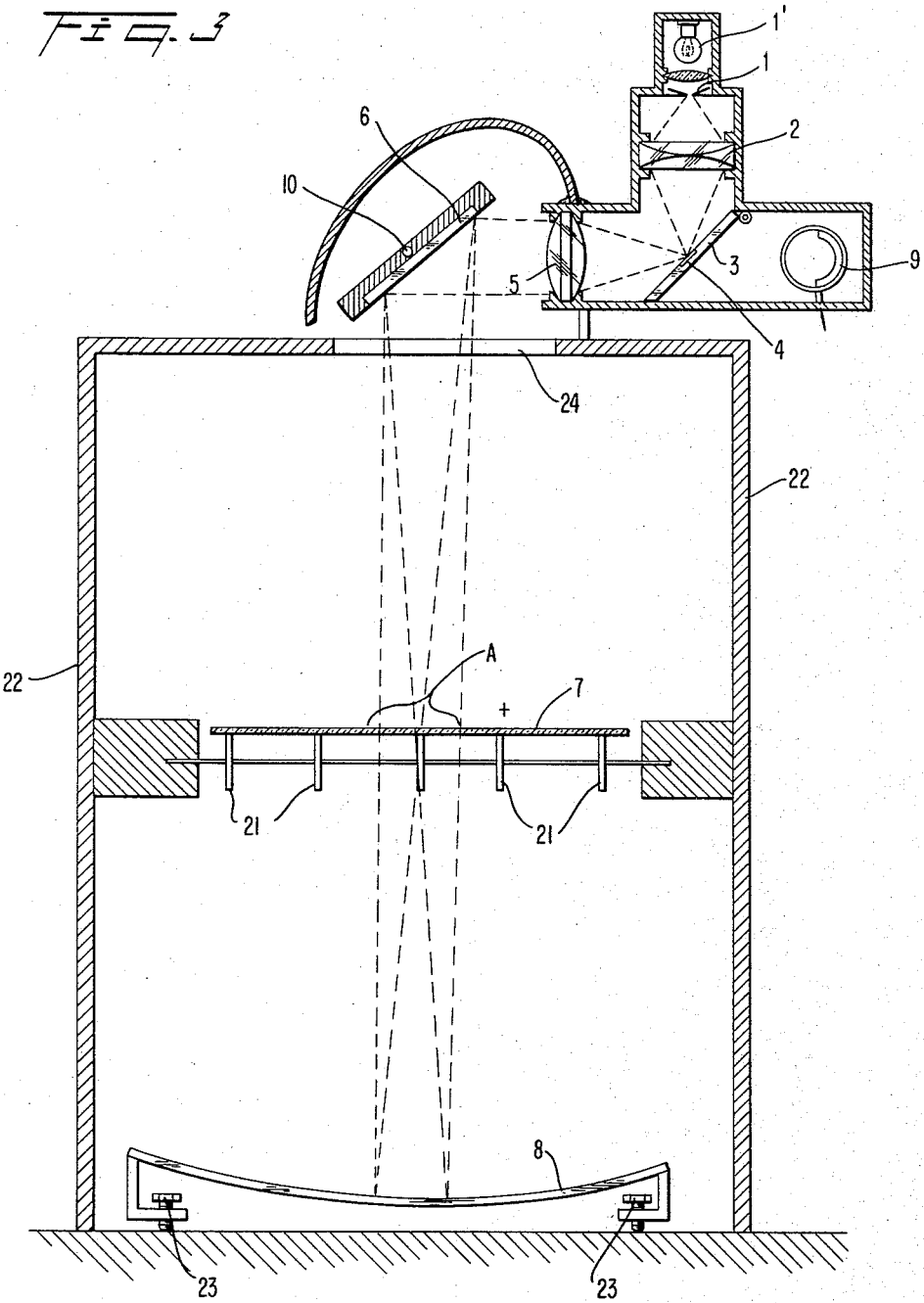

3,338,130
PROCESS AND APPARATUS FOR THE DETECTION OF FLAWS IN TRANSPARENT SHEETS
Jean Paul Gaffard, Paris, France, assignor to Compagnie de Saint-Gobain, Neuilly-sur-Seine, France
Filed Dec. 11, 1961, Ser. No. 158,278
Claims priority, application France, Dec. 13, 1960, 846,757
4 Claims. (Cl. 88—14)

This invention relates to the detection of defects in a transparent sheet. This problem is particularly acute in the formation of transparent sheets such as glass plates in which the sheet is continuously produced from a furnace and is ground and polished before being cut to size. The invention will be described in connection with this particular problem, but the description does not constitute a limitation on the generalities of its application.

The detection of defects in transparent sheets such as transparent glass and plastic sheets is currently made by simple visual examination in which the observer detects defects such as tears, bubbles, stones, scratches, inclusions, waves, radial line and surface roughness. This visual inspection depends upon the sharpness of vision, the experience and judgment of the observer and is thus subject to human error, and furthermore can only be used with difficulty when modern methods of continuous manufacture are employed. This problem has become increasingly urgent as speeds of manufacture have become higher, and it has been proposed to place a large number of light sources near one of the faces of the transparent sheet in order to inspect all parts of the sheet, these light sources being observed by photosensitive means placed near the other face of the sheet, the detection of defects being accomplished by detecting the light originating from the source which has been deflected by the imperfections.

The application of that method involves considerable difficulty as each point of the surface of the ribbon must be inspected by light of uniform intensity. Now, as one multiplies the individual sources, the sources do not generally produce beams of identical intensity and the very number of instruments required posed technical problems of some magnitude.

It is an object of this invention to accomplish the inspection of transparent sheeting by diffusion in a beam of light caused by defects in the transparent sheet, by photoelectric means which are comparatively simple and involve only a single source of light.

The object as to process are accomplished, generally speaking, by the method of detecting flaws in a sheet of material which comprises sweeping the sheet with a beam of rays which pass through the sheet, reflecting the rays back through the sheet along the same path, and activating photosensitive means by rays deflected from the beam by imperfections in the sheet.

The object as to apparatus are accomplished, generally speaking, by the apparatus for the detection of flaws in transparent sheet which comprises means to establish a beam of substantially constant intensity, means to sweep the beam across and through a transparent sheet the perfection of which is to be determined, means to reflect the beam back through the sheet along the same path, and means to intercept and respond to rays of the beam which are deflected from the said path by imperfections in the sheet.

This invention inspects the sheet for internal and external imperfections such as defects of polish and the presence of faults, bubbles, stones and the like. It measures the light diffused by the defects internally or externally of the sheet by sweeping the sheet with a light beam of controlled dimensions and reflecting the beam through the sheet upon itself on the same path which it followed in passing through the sheet, the beam thus returning to its source so long as it is undeflected by an imperfection in the sheet. When an imperfection appears under the beam a deflection of rays of the beam occurs and these rays are picked up by a light responsive means such as a photoelectric cell. As signaling and marking means, operable by the cell, are not a part of this invention they will not be described.

In this invention a filter or separator element is placed between the source of light and the sheet so that the rays being returned to the source will not be passed by the filter unless they are deflected by an imperfection internally or externally of the sheet. The invention utilizes a single source of light and a single photosensitive apparatus. A reflecting means placed on the other side of the transparent ribbon from the light source intercepts the light beam and returns it upon its original path. The area illuminated where the beam strikes the reflecting surface may be considered as an auxiliary light source.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a diagrammatic view of an apparatus embodying the principle of the invention;

FIG. 2 is a diagrammatic view of a modified form of the invention utilizing a flat mirror;

FIG. 3 is a vertical sectional view through a preferred form of apparatus, the parts being largely diagrammatically illustrated.

In FIG. 1 a source of light 1' is directed upon a screen 1 which has a small aperture constituting a point source of light which is received by a condenser 2 focused on small mirror 4 which is located in the center of a transparent plate 3. The image of the source given by the condenser is formed on the small "mirror" having the dimensions of the image. The rays reflected by the mirror 4 pass through a lens 5 which directs them uniformly upon a mirror 6 mounted on a horizontal pivot 10. The beam passes downward to a mirror 8, traversing the sheet 7 which is to be inspected, and is reflected back upon itself, striking the mirror 6, being returned through lens 5 to the small mirror 4 and back through condenser 2 to the point source in screen 1. The face of the mirror 8 is curved on a radius which is centered on pivot 10 of the mirror 6 so the reflected beam, not shown, will strike the mirror 6 after passing through the sheet 7 and return to its source. If the reflected beam strikes an imperfection internally or externally in the sheet 7 on its return, rays are deflected from the parallelism imposed by the apparatus, striking the mirror 6 and passing through the lens 5, missing the mirror 4 and passing through the transparent plate 3 to the photosensitive means 20 which may be a photoelectric cell or other light responsive apparatus. The cell is thus activated and in turn activates recording or signaling means by any known method and any known type. The mirror 6 is turned about pivot 10 so that it sweeps the sheet 7 from side to side.

In the manufacture of sheet glass the sheet 7 may be presumed to be continuous and to be in motion away from the observer as viewed upon FIGURE 1. The mirror 6 being pivotally reciprocated directs the beam from side to side of the sheet under inspection at a rate which is related to the speed of the sheet. Rapid movement of the mirror 6 permits traverse and successive sweepings of the sheet so as to cover the entire surface of the sheet. Inasmuch as the mirror 6 may cast a beam of substantial dimensions upon the sheet the complete coverage of the sheet is possible.

The mirror 8 is preferably cylindrical with an axis coincident with axis 10 of mirror 6.

The apparatus 6 has been shown as a simple mirror but it could equally well consist of a prism or prisms, one or several of which could be movable in order to accomplish the traverse of the light beam across the sheet.

In some cases it may be desirable to have the mirror 6 fixed with respect to the optical system. For example, one may oscillate or turn the entire apparatus about an axis thus maintaining the mirror 6 in fixed position. This axis should be substantially parallel to the direction of motion of the sheet 7. An advantage can be obtained in this case by subjecting the optical ensemble as shown in FIG. 1 to a rotation of 90° to the direction shown in FIG. 1. In this case the optical apparatus will be displaced so that the beam issuing from the objective 5 will travel parallel to the direction of movement of the ribbon so that its axis will be at right angles to the direction of axis 10 as shown in FIG. 1. The mirror 6, of which the active surface is thus maintained in fixed position relative to the beam, then reflects upon the surface 8 as aforesaid and the oscillatory or gyratory motion of the whole apparatus around its axis permits sweeping of the whole sheet by the light beam.

It is equaly possible to remove the mirror 6 by transposing the apparatus so that the beam issuing from objective 5 passes through the sheet to the mirror 8, the apparatus composed of 5, 4, 3, 2, 1, 1' and 20 being pivoted appropriately to sweeping its beam across the surface of sheet 7.

FIG. 2 shows another form of the invention in which the reflective surface 14 is flat in place of the cylindrical surface 8 of FIG. 1. The reflective surface 14 is parallel to the sheet 7 and the elements 1, 2, 3, 4, 5, 11, 12 and 20 are fixed in relation to each other and are the same as those which have been described hereinabove. The beams which issue from the mirror 12 are perpendicular to the sheet and the reflector. The mirror 6 of FIG. 1 is replaced by a complex of two mirrors 11 and 12 fixed with respect to each other but which can be turned horizontally around a vertical axis 15 which passes through the center of mirror 11. The two mirrors are arranged with respect to each other so that the beams to and from the surface 14 are both vertical. When the apparatus is rotated about the axis 15 the beam describes the arc of a circle and the angular speed of rotation is such that all parts of the sheet 7 are scanned, it being understood that in FIG. 2 the sheet of glass 1 is being moved at constant velocity away from the observer.

In the apparatus just described all the parts of the apparatus may be enclosed in a single case which is itself mounted for revolution about the axis 15.

In FIG. 3 is shown an apparatus of the type of FIG. 1 in which a sheet 7 of glass is presumed to have been formed, cooled, ground and polished and to be moving away from the observer. The sheet passes over supports 21 which maintain the plane form of the sheet, an enclosure 22 contains the sheet and, beneath it, cylindrical mirror 8 which is mounted upon adjusting screws 23. An opening 24 in the enclosure permits rays from the mirror 6, which is mounted on pivot 10 as above described, to pass into the enclosure 22 and through moving glass plate 7 to the reflector 8 from whence it is reflected back through the system to the aperture in baffle 1. The mirror is oscillated about axis 10 so that the whole surface of sheet 7 is scanned from side to side as the sheet advances, the area of the sheet within the beam being so substantial that the boundaries of the paths of successive sweeps overlap, no part of the sheet being missed. If light from the returning beam is deflected from within the area A, indicated by the bracket, which may be circular or of angular boundary, it will be deflected, will strike the mirror 6 at an angle which will not strike the small mirrored surface 4 but will pass through the transparent plate 3 and activate the cell 9.

The filter which, in the foregoing examples is composed of a glass plate 3 having a silvered surface 4 of small dimensions, may be composed of a phase plate or a couple of birefringent prisms.

This invention is particularly valuable in revealing defects such as waves and rays which deflect rather than absorb light rays. When one wishes to locate defects which on the other hand produce an absorption of light rays, the filter 3 is preferably replaced by a separator element constituted by a semi-reflecting mirror. A part of the beam of light reflected by mirror 6 passes through the semi-reflecting mirror and toward the cell 9. This portion of light flux is reduced when the presence of a light absorbing imperfection intercepts the rays returning from the reflector beneath the plate.

As set forth hereinabove the apparatus is useful for locating defects in any type of transparent sheet. It can also be used for the valuation of defects in polish because such defects tend to diffuse the light and reduce its intensity at mirror 6. In this case one may omit the sweeping of the glass surface and operate with a beam of constant directions which will locate the defect in polish at its point on the length of the sheet.

In a particular form of the invention a glass sheet traveling at 3 meters per minute was swept by a square beam of 2.5 centimeters per side, following FIG. 1 and FIG. 3. In order to completely cover the sheet it was swept 120 times per minute. The optical signal was proportioned to the importance of the defect and, for a defect of a small size, lasted for a duration of 0.67 milliseconds.

A general low tone was maintained by the passage of parasitic light through the filter 3 upon which the louder response caused by defects in the sheet were superimposed. The parasitic response is eliminable by electric circuits of band pass filter type which eliminate all frequency outside 1,000 to 10,000 Hz.

Among the advantages of the invention are the accomplishments of the objects of the invention, the location of defects either of surfaces or material, in transparent sheets. The invention is particularly advantageous in its application to continuous manufacture of polished glass sheets. The apparatus is small, of relatively inexpensive manufacture, sure in operation to respond to defects large and small, and reveals the magnitude of the defects by the intensity of the response generated by the deflected light.

Although only a limited number of embodiments of the invention have been illustrated in the accompanying drawings and described in the foregoing specification, it is to be expressly understood that the invention is not limited thereto. Various changes may be made without departing from the spirit and scope of the invention as the same will be understood by those experienced in the art.

What is claimed is:

1. Apparatus for the detection of flaws in a moving transparent sheet which comprises means to generate a beam of light and to focus it upon first reflective means located before a light responsive means, second reflective means optically aligned with said first means, means to pivot the second means to sweep the sheet with the beam received from said first means, reflective means beyond the sheet which is responsive in all positions of the second means to reflect the beam back upon itself and, with the optical train, to focus it upon the first means, which blocks the undeflected returning beam from the light responsive means, said light responsive means comprising photoelectric means adapted to intercept rays deflected past the first means by imperfections in the sheet.

2. Apparatus according to claim 1 in which the reflective means beyond the sheet is a curved mirror, and the second reflective means is a pivotally mounted mirror, the light beam from which is focused upon the curved mirror, the pivotal movement of which sweeps the moving sheet from side to side.

3. Apparatus according to claim 1 in which the second reflective means comprises a plurality of mirrors optically aligned with said first means and physically aligned parallel to the sheet, the reflective means beyond the sheet comprises a flat mirror upon which the beam from the second reflective means is focused, and the second reflective means is pivotally mounted to swing about an axis transverse to the plane of the sheet.

4. Apparatus according to claim 1 in which the optical trains includes a lens between the light source and the first reflective means, and a lens between the first reflective means and the second reflective means, the first reflective means has transparent and reflective parts, the reflective part of which is angularly disposed at the focal points of the said beams, and the light responsive means is aligned with the beam returning from the second reflective means to the first reflective means.

References Cited

UNITED STATES PATENTS

| | | | |
|---|---|---|---|
| 2,718,816 | 9/1955 | Loeck | 250—219 |
| 2,735,331 | 2/1956 | McMaster et al. | 88—14 |
| 2,889,737 | 6/1959 | Griss et al. | 88—14 |
| 2,964,640 | 12/1960 | Wippler | 88—14 X |
| 3,005,916 | 10/1961 | Lentze | 88—40 |

JEWELL H. PEDERSON, *Primary Examiner.*

T. L. HUDSON, C. E. QUARTON, *Assistant Examiners.*